US012623248B2

(12) United States Patent
Lee et al.

(10) Patent No.: US 12,623,248 B2
(45) Date of Patent: May 12, 2026

(54) SMART SEALER MANAGEMENT SYSTEM AND METHOD

(71) Applicants:HYUNDAI MOTOR COMPANY, Seoul (KR); Kia Corporation, Seoul (KR)

(72) Inventors: Seung Ho Lee, Hwaseong-si (KR); Sung Hwan Seo, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 35 days.

(21) Appl. No.: 18/942,093

(22) Filed: Nov. 8, 2024

(65) Prior Publication Data

US 2026/0008076 A1　　Jan. 8, 2026

(30) Foreign Application Priority Data

Jul. 4, 2024　(KR) ........................ 10-2024-0088227

(51) Int. Cl.
　　*B05C 11/10*　　　(2006.01)
　　*G06Q 10/0631*　　(2023.01)
　　*G08B 21/18*　　　(2006.01)
(52) U.S. Cl.
　　CPC ........ *B05C 11/101* (2013.01); *G06Q 10/0631* (2013.01); *G08B 21/18* (2013.01)
(58) Field of Classification Search
　　CPC ... B05C 11/101; G06Q 10/0631; G08B 21/18
　　See application file for complete search history.

(56) References Cited

U.S. PATENT DOCUMENTS

| | | | | |
|---|---|---|---|---|
| 5,805,279 A | * | 9/1998 | Palombo ............ | G01N 21/8806 |
| | | | | 356/239.4 |
| 9,389,114 B2 | * | 7/2016 | Rietsch, Jr. ......... | G01F 23/2967 |
| 2006/0086407 A1 | * | 4/2006 | Herre .................... | B05B 5/1675 |
| | | | | 141/100 |
| 2018/0272377 A1 | * | 9/2018 | Sadri ................... | B05C 11/1039 |
| 2019/0072118 A1 | * | 3/2019 | Zientara ................ | F15B 13/044 |

FOREIGN PATENT DOCUMENTS

| | | |
|---|---|---|
| KR | 10-1659890 B1 | 9/2016 |
| KR | 10-2020-0072117 A | 6/2020 |

* cited by examiner

*Primary Examiner* — John A Tweel, Jr.
(74) *Attorney, Agent, or Firm* — Fish & Richardson P.C.

(57)　　　　　　ABSTRACT

A sealer management system processes a method for monitoring a sealer usage. The sealer management system includes: an application unit for applying a sealer to a vehicle body; a pump for supplying the sealer to the application unit; a first sensor for detecting absence of a sealer inside a sealer drum, and a second sensor for detecting whether the sealer drum has been replaced; a sealer application device including an application controller that recognizes when the sealer drum is replaced based on the detection information of the first sensor and the second sensor, and calculates the actual sealer usage by counting the number of times of the replacement of the sealer drum; and a management server that compares the actual sealer usage obtained from the sealer application device with a set standard sealer usage to determine whether a sealer usage failure event occurs.

18 Claims, 7 Drawing Sheets

SMART SEALER MANAGEMENT SYSTEM AND METHOD

CROSS-REFERENCE TO RELATED APPLICATION

This application claims priority to and the benefit of Korean Patent Application No. 10-2024-0088227, filed in the Korean Intellectual Property Office, on Jul. 4, 2024, the entire contents of which are incorporated herein by reference.

TECHNICAL FIELD

The present disclosure relates to a smart sealer management system and method, and more particularly, to a smart sealer management system and method of automatically managing an actual usage of a sealer for painting a vehicle body.

BACKGROUND

Vehicle factories may perform paint operations in which sealers are applied to gaps generated in a steel overlap portion, a connection portion, and the like in an assembled vehicle body.

The sealer for painting the vehicle body is a subsidiary material that is related to rust resistance, rigidity, durability, and watertightness quality of a vehicle. For example, omitting the sealer application or an insufficient amount of the sealer applied may lead to corrosion or watertightness issues of the vehicle, which may reduce the durability of the vehicle. In addition, insufficient application of an adhesive for a structure, which ensures the rigidity of the vehicle, may reduce the rigidity of the vehicle, thereby reducing customer safety and reliability. Therefore, the sealer usage may be well controlled to avoid missing sealer applications or poor quality due to the small amount of sealer applied during vehicle body painting.

In some cases, sealer material receipts, the record of the sealer usage, line inputs, and determination of sealer application amounts are managed manually by humans, so that the management of the sealer usage may be difficult.

In some cases, when a quality problem occurs due to omitting of a large number of lots of sealer applications and/or the insufficient amount of sealer applied due to the absence of the management of the data-based sealer application amount, it may be difficult to identify when and on which line the problem occurred.

In some cases, painting operations may sometimes excessively apply the sealer to avoid missing of the sealer application and the insufficient amount of sealer applied, which may lead to the increased usage of sealer subsidiary material and decreased profitability. In some cases, it may be difficult to recognize the history and cause of the problem in the event of excessive application of the sealer, resulting in wasted subsidiary material usage and decreased profitability.

SUMMARY

The present disclosure describes a smart sealer management system and method of automatically managing the right usage of a sealer for painting a vehicle body to be available at the right place at the right time by monitoring the actual sealer usage based on information detected through sensors applied to a pump and responding quickly in the event of the poor sealer usage.

According to one aspect of the present disclosure, a smart sealer management system includes: an application unit for applying a sealer to a vehicle body; a pump for supplying a sealer for an application work of the application unit; a first sensor for detecting absence of a sealer inside a sealer drum being used in the pump, and a second sensor for detecting whether the sealer drum has been replaced; a sealer application device including an application controller that recognizes when the sealer drum is replaced based on the detection information of the first sensor and the second sensor, and calculates the actual sealer usage by counting the number of times of the replacement of the sealer drum; and a management server that compares the actual sealer usage obtained from the sealer application device with a set standard sealer usage to determine whether a sealer usage failure event NG outside an allowable range occurs.

In some implementations, the first sensor may include: a first plate fixedly mounted downwardly in a longitudinal direction on one side of an upper plate of the pump and ascending or descending with an operation of an induction plate for sealer suction; and a first physical switch for generating a no sealer detection signal when the induction plate descends to a bottom of the sealer drum and makes physical contact with the first plate.

In some implementations, the second sensor may include: a second plate fixedly mounted downwardly in a longitudinal direction on the other side of the upper plate of the pump and ascending or descending with the operation of the induction plate for sealer suction; and a second physical switch that is turned on by physical contact with the second plate when the induction plate descends to detect that a sealer is in use, and that generates a sealer drum replacement signal when the physical contact is released when the induction plate ascends and the second physical switch is switched to off.

In some implementations, the first sensor and the second sensor may be configured as rotary limit switches fixed at different heights.

In some implementations, the application controller may raise a location of the induction plate to a location higher than the upper surface of the sealer drum when the sealer drum of the pump is replaced, and lower the location of the induction plate to a location of the upper surface of the sealer of the sealer drum for sealer use after the sealer drum is replaced.

In some implementations, when the second sensor is switched to on when the induction plate is lowered, and the first sensor is switched to on when the location of the induction plate reaches a bottom of the sealer drum, the application controller may detect absence of sealer and generate a sealer drum replacement alarm.

In some implementations, the application controller may count and accumulate the number of times of replacement of the sealer drum as "1" when both the first sensor and the second sensor are switched to the off state when the location of the induction plate is raised for the replacement of the sealer drum.

In some implementations, the application controller may multiply the accumulated number of times of the replacement of the sealer drum by a weight of sealer in a drum registered for each sealer type to calculate the actual sealer usage.

In some implementations, when the actual sealer usage exceeds an upper limit of an allowable range, the management server may determine that a sealer excessive usage event NG #1 occurs, and when the actual sealer usage falls below a lower limit of the allowable range, the management server may determine that a sealer short usage event NG #2 occurs.

In some implementations, when the sealer excessive usage event NG #1 or the sealer short usage event NG #2 occurs, the management server may recognize failure cause information including an ID and a location of a sealer application device corresponding to the corresponding actual sealer usage and transmit an alarm message to a manager.

In some implementations, the management server may perform autonomous application amount management control that reduces or increases the amount of sealer applied in stages for the sealer application device that have experienced the sealer excessive usage event NG #1 or the sealer short usage event NG #2.

In some implementations, the standard sealer usage may be set through experiments and learning, taking into account at least one of a target vehicle type, a vehicle body part, the number of vehicles produced, the type of sealer, a capacity of the sealer drum, and characteristics of an application unit applied to application work of the sealer application device.

In another aspect, a smart sealer management method automatically manages the sealer usage of sealer application devices in the factory. The smart sealer management method includes: lowering, by an application controller, an induction plate of a pump to a location of an upper surface of a sealer inside a sealer drum for using a sealer; switching the second sensor for detecting replacement of the sealer drum to an on state according to the lowering of the induction plate; continuously lowering, by the application controller, a location of the induction plate in accordance with the sealer usage in the sealer drum; detecting, by the application controller, absence of the sealer when the position of the induction plate reaches a bottom of the sealer drum and the first sensor is switched on and generating an alarm to replace the sealer drum; and calculating, by the application controller, the actual sealer usage by counting the number of times of the replacement of the sealer drum when the position of the induction plate rises to cause both the first sensor and the second sensor to be switched to the off state to replace the sealer drum.

In some implementations, the smart sealer management method may further include: after the calculating of the actual sealer usage, obtaining, by a management server, the actual sealer usage from the application controller; and comparing the actual sealer usage with a reference standard sealer usage to determine whether a sealer usage failure event NG outside an allowable range occurs.

In some implementations, the determining of whether the sealer usage failure event occurs may include: determining that when the actual sealer usage exceeds an upper limit of an allowable range, a sealer excessive usage event NG #1 occurs; and determining that when the actual sealer usage falls below a lower limit of the allowable range, a sealer short usage event NG #2 occurs.

In some implementations, the determining of whether the sealer usage failure event occurs may include: determining, when the sealer excessive usage event NG #1 or the sealer short usage event NG #1 occurs, failure cause information including an ID and a location of a sealer application device corresponding to a corresponding actual sealer usage; and displaying the failure cause information on a sealer usage monitoring screen (graphical user interface (GUI)) or transmitting an alarm message to a manager terminal.

In some implementations, the smart sealer management method may further include: after the determining of whether the sealer usage failure event occurs may further include performing, by the management server, autonomous application amount management control that reduces or increases the amount of sealer applied in stages for the sealer application device that have experienced the sealer excessive usage event NG #1 or the sealer short usage event NG #2.

In some implementations, the smart sealer management method may further include: after the performing of the autonomous application amount management control, adjusting, by the application controller, the amount of sealer applied by adjusting at least one of a sealer pressure supplied from the pump and an opening rate of the application unit in accordance with an autonomous application amount management control command of the management server.

In some implementations, it is possible to monitor the actual sealer usage of individual sealer application devices to prevent poor quality due to short usage of the sealer compared to the standard sealer usage, and to prevent waste of subsidiary materials and decreased profitability due to excessive use of sealer.

In some implementations, by learning the numerical data history considering at least one of the target vehicle type, vehicle part, the number of vehicle produced, sealer type, sealer drum capacity, and application unit characteristics applied to the sealer application work (line/process), the optimal standard sealer usage reference may be established, thereby improving the accuracy of the sealer usage by sealer type, line, and process and reducing the cost of sealer application modification/management.

In some implementations, by centrally managing the real-time actual sealer usage and real-time fluctuations, and enabling managers to immediately respond to sealer failure events and causes of failure, it is expected to improve the reliability of sealer application quality and prevent waste of subsidiary material costs due to excessive application.

DETAILED DESCRIPTION

Hereinafter, one or more implementations of the present disclosure will be described with reference to accompanying drawings so as to be easily understood by a person ordinarily skilled in the art.

A smart sealer management system and method will now be described in detail with reference to the drawings.

Figure 1:
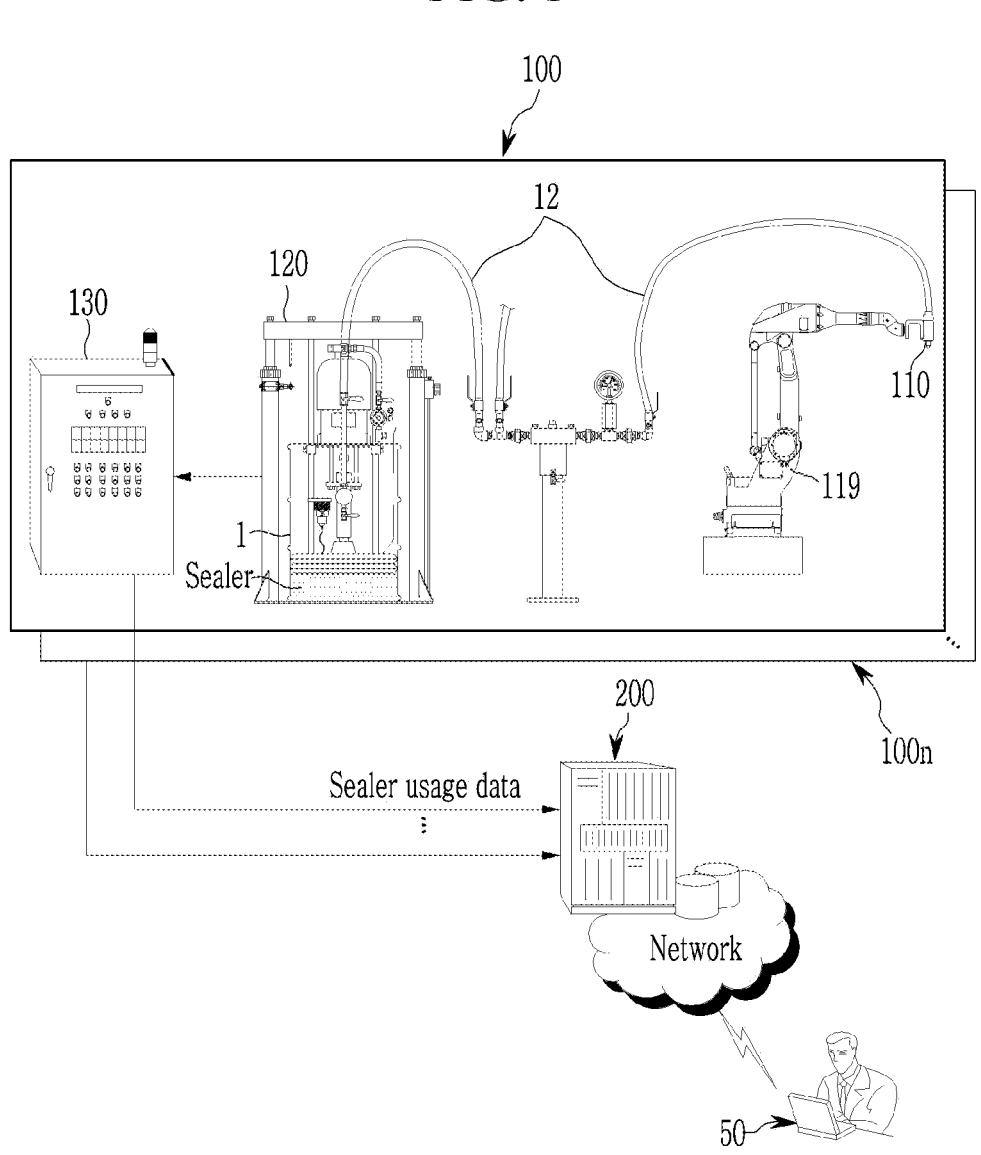
FIG. 1 is a diagram schematically illustrating an example configuration of a smart sealer management system.
Figure 2:
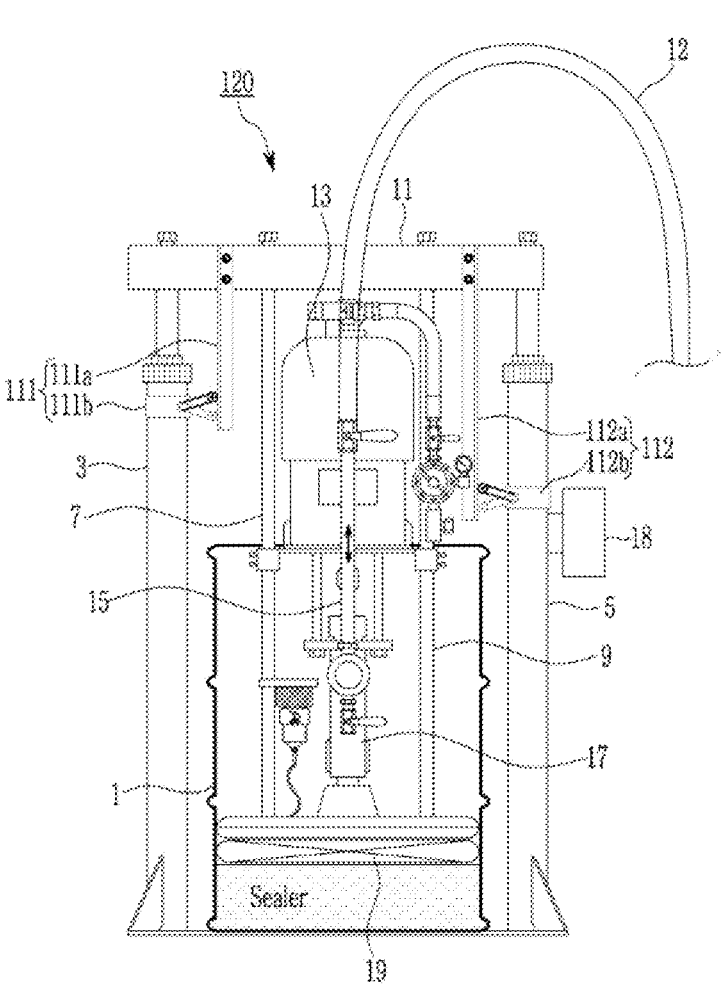
FIG. 2 is a diagram schematically illustrating an example configuration of a pump.

FIG. 1 is a diagram schematically illustrating an example configuration of a smart sealer management system. FIG. 2 is a diagram schematically illustrating an example configuration of a pump.

Referring to FIGS. 1 and 2, in some implementations, a smart sealer management system includes an application unit 110 for applying a sealer to a vehicle body, a pump 120 for supplying a sealer for an application work of the application unit 110, a first sensor 111 for detecting absence of a sealer inside a sealer drum 1 being used in the pump 120, and a second sensor 112 for detecting whether the sealer drum 1 has been replaced, a sealer application device 100 including an application controller 130 that determines the replacement time of the sealer drum 1 based on the detection information of each of the sensor units 111 and 112 and calculates the actual sealer usage by counting the number of times the sealer drum 1 is replaced, and a management server 200 for comparing the actual sealer usage obtained from the sealer application device 100 with the set standard sealer usage to determine whether a sealer usage failure event (hereinafter referred to as a "sealer failure event") outside an allowable range occurs.

Hereinafter, in the description of the present disclosure, the "sealer drum" may be referred to as a "sealer can" depending on the type of sealer, container shape, and capacity, and will be referred to collectively as a "sealer drum" unless otherwise distinguished.

In some examples, the application unit 110 performs application work of spraying or injecting the sealer at a predetermined location on the vehicle body. The application unit 110 can include a sprayer, an injector, etc.

The application unit 110 is mounted on a front end of an arm of an articulated robot 119 and may be automatically turned ON/OFF to start or stop the application of the sealer according to an applied control signal. However, the exemplary embodiment of the present disclosure is not limited thereto, and the application unit 110 may also be configured as a handheld gun that may be gripped by an operator.

The pump 120 is installed on a horizontal floor as an auxiliary facility for pumping (supplying) the sealer contained in the sealer drum 1 to the application unit 110.

The pump 120 has a structure in which ram cylinders 3 and 5 and guides 7 and 9 are formed on the left and right sides, respectively, centering on an air motor 13 for transferring the sealer, and an upper plate 11 is connected to the upper parts of the ram cylinders 3 and 5 and the guides 7 and 9.

The air motor 13 is located between the guides 7 and 9 under the upper plate 11 and is connected with an air motor shaft 15 on the lower side. At the lower end of the air motor shaft 15, a lower pump 17 is installed, and an induction plate 19 is installed at the lower end of the lower pump 17 to obtain a high sealer hydraulic pressure. In addition, a pneumatic unit 18 is installed for operating the ram cylinder 5.

Thus, the pump 120 may operate the ram cylinders 3 and 5 through the pneumatic unit 18 to raise or lower the upper plate 11, thereby causing the induction plate 19 connected with the upper plate 11 to be also raised or lowered together along the guides 7 and 9. In some examples, the up and down movement of the air motor shaft 15 may cause the sealer inside the sealer drum 1 to be introduced into the lower pump 17, and the introduced sealer is discharged through the sealer line 12.

Now, the first sensor 111 and the second sensor 112 will be described.

The first sensor 111 includes a first plate 111a and a first physical switch 111b.

The first plate 111a is fixedly installed in the downward longitudinal direction on one side of the upper plate 11 of the pump 120 and is raised and lowered with the motion of the induction plate 19 for sealer suction.

The first physical switch 111b generates a no sealer detection signal when physical contact is made with the descending first plate 111a during sealer use. For example, the first physical switch 111b remains in the OFF state when the sealer is in use. Then, when the induction plate 19 is lowered to the bottom of the sealer drum 1 and the sealer is used up, the induction plate 19 may be switched to the ON state by physical contact with the first plate 111a.

The second sensor 112 includes a second plate 112a, and a second physical switch 112b.

The second plate 112a is fixedly installed in a downward longitudinal direction on the other side of the top plate 11 of the pump 120 and is raised or lowered with the motion of the induction plate 19.

When the induction plate 19 is lowered for sealer suction, the second physical switch 112b is turned ON by physical contact with the second plate 112a to detect that the sealer is in use. Further, when the physical contact is released by the ascending of the induction plate 19 and the second physical switch 112b is switched to OFF, a sealer drum replacement signal is generated.

The first plate 111a and the second plate 112a are fixedly installed on both sides of the upper plate 11 integral with the induction plate 19, and are characterized in that the second plate 112a is formed to be longer in the downward longitudinal direction compared to the first plate 111a.

The first physical switch 111b and the second physical switch 112b are configured by using low-cost rotary limit switches (for example, adjustable rotary limit switch) fixed at different heights. The first physical switch 111b and the second physical switch 112b are off when the first physical switch 111b and the second physical switch 112b are not in contact and are switched on only when the first physical switch 111b and the second physical switch 112b are in physical contact with the first and second plates 111a and 112a.

The application controller 130 controls the overall operation of the application unit 110 and the pump 120 for the application work of the sealer application device 100, and stores at least one programmable logic controller (PLC) program and data for the control. Thus, it may be understood that the operation of the application unit 110 and the pump 120 described above is substantially controlled by the application controller 130.

The application controller 130 applies control signals to the application unit 110 to control whether to operate the sealer application (on/off) and the amount of sealer applied. The application controller 130 may adjust the amount of sealer applied by adjusting at least one of the sealer pressure supplied from the pump 120 and the opening rate of the application unit 110 according to the control instructions of the management server 200.

The application controller 130 recognizes a state of no sealer according to a detection signal (on) of the first sensor 111 and determines a time for replacing the sealer drum 1. Further, the application controller 130 recognizes that the sealer drum has been replaced according to a detection signal of the second sensor 112 and counts and accumulates a number of times of drum replacement by "1". The application controller 130 then transmits sealer usage data, including the accumulated number of times of the drum replacement and at least one of a corresponding sealer application device ID and a process line/module ID, to the management server 200. In this case, the application controller 130 may multiply the accumulated number of times of the replacement of the sealer drum by the weight of sealer in the drum registered for each sealer type to calculate the actual sealer usage.

The operating principle of the pump 120 of the sealer application device 100 and the process of replacing (exchanging) the sealer drum will be described in detail with reference to FIG. 3.

Figure 3:
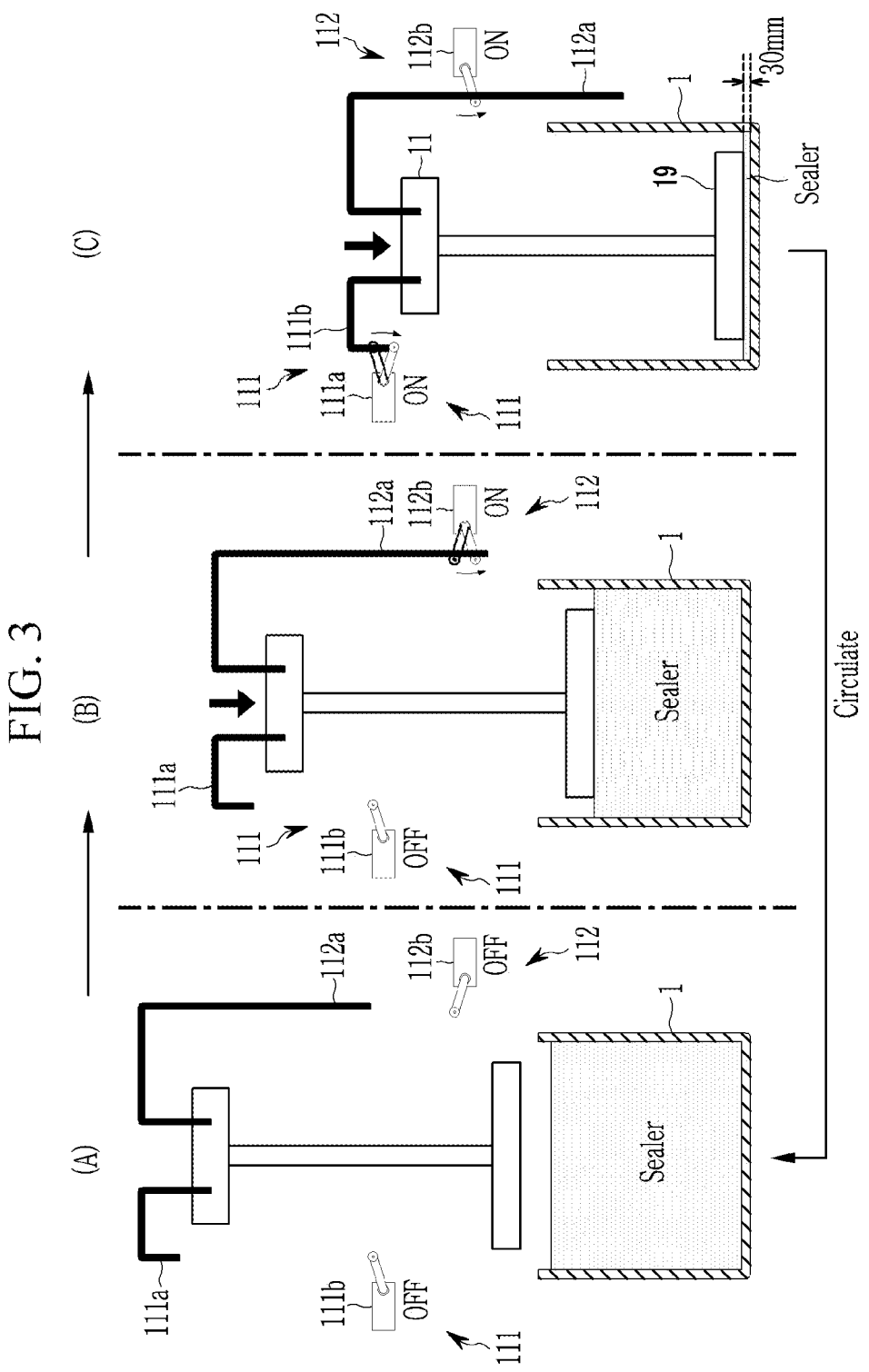
FIG. 3 is a diagram schematically illustrating an example operational state of the pump during sealer drum replacement.

FIG. 3 is a diagram schematically illustrating an operational state of the pump during sealer drum replacement.

Referring to (A) of FIG. 3, the state immediately after replacing the sealer drum of the pump 120 is illustrated.

When the sealer drum 1 of the pump 120 is replaced, the application controller 130 location the induction plate 19 to the highest location for a smooth replacement. For example, the sealer drum 1 is replaced in a horizontal direction in the state where the induction plate 19 is raised to a location higher than the upper surface of the sealer drum 1.

When the sealer drum is replaced, both the first sensor 111 and the second sensor 112 are turned off. Furthermore, the interior of the replaced sealer drum 1 is in a state of being filled with the most sealer (that is, the upper surface of the sealer is the highest).

Referring to (B) of FIG. 3, the sealer usage state of the pump 120 is illustrated.

The application controller 130 lowers the induction plate 19 to the location of the upper surface of the sealer inside the sealer drum 1 for sealer use. And, when the sealer is used, the location of the induction plate 19 is continuously lowered according to the sealer usage.

At this time, the second sensor 112 for detecting the sealer drum replacement is switched to the on state and remains in the on state continuously until the next sealer replacement when the sealer inside the sealer drum 1 is used up. That is, the second physical switch 112b of the second sensor 112 is switched to the ON state by physical contact with the second plate 112a, which is lowered together with the lowering of the induction plate 19 when the sealer is used.

In some examples, the first physical switch 111b of the first sensor 111 for detecting no sealer inside the sealer drum 1 is no contact with the first plate 111a and remains in the off state.

Referring to (C) of FIG. 3, the no sealer detection state of the pump 120 is illustrated.

The application controller 130 detects the absence of sealer when the location of the induction plate 19 reaches the bottom of the sealer drum 1 during sealer use and the first sensor 111 is switched to on. That is, the first physical switch 111b of the first sensor 111 is switched to the on state by physical contact with the first plate 111a, which is lowered together with the lowering of the induction plate 19 during sealer use.

Therefore, the application controller 130 determines that it is time to replace the sealer drum when the first sensor 111, which detects no sealer in the sealer drum 1, and the second sensor 112, which detects the replacement of the sealer drum, both satisfy the condition of being turned on. Further, the application controller 130 may make a visual and/or audible alarm to the operator the time when the sealer drum is replaced.

In some examples, when all the sealer inside the sealer drum 1 is used (that is, when no sealer is detected), the location of the induction plate 19 is at the lowest bottom surface. In this case, a small amount of unused residual sealer is left in the space between the induction plate 19 and the bottom surface of the sealer drum 1.

In this case, it may be considered to use all of the remaining residual sealer in the sealer drum 1, but this may cause another problem in that air is introduced into the sealer line 12 due to the air motor 13 of the pump 120 being struck (that is, air is introduced along with the residual sealer), which deteriorates the sealer application performance. Furthermore, there is a concern of sealer curing due to frictional heat.

Therefore, the first sensor 111 is characterized in generating a no-sealer detection signal by leaving a certain clearance space (for example, about 30 mm) between the induction plate 19 and the bottom of the sealer drum 1. Thus, it is possible to prevent air from introduction to the sealer line 12 by air motor blowing and to prevent curing of the sealer due to frictional heat.

Furthermore, more accurate measurement and calculation of the sealer usage is possible when no sealer is detected by the first sensor 111 with the above clearance space.

For example, in contrast to the present disclosure, it may be considered to detect the sealer usage at the part where the sealer is applied (for example, at the application unit side).

However, even though any sensor is installed to detect the sealer usage at the part where the sealer is applied, the sensor fails to detect the amount of residual sealer that is unused and discarded inside the sealer drum 1. This has the disadvantage of causing an error between the actual sealer usage and the detection data, thereby failing to accurately calculate the actual sealer usage.

In some examples, the amount of sealer remaining inside the sealer drum and being discarded may be calculated, which has the advantage of enabling a more accurate calculation of the actual sealer usage, thereby increasing data reliability.

The management server 200 monitors the sealer usage state of the plurality of sealer application devices 100 that is being in operation in the factory. The management server 200 detects at least one of equipment, process line, or process module identification information (ID) based on the location of the occurrence of a sealer failure event and makes an alarm about a result of the detection to the manager terminal 50.

Figure 4:
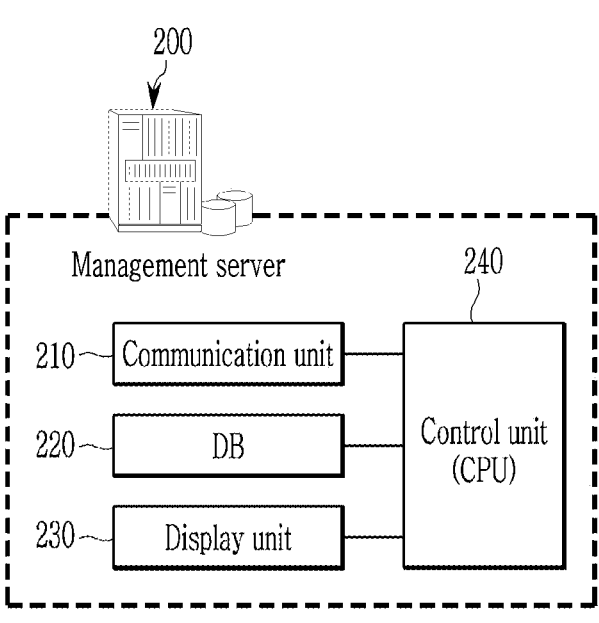
FIG. 4 is a block diagram schematically illustrating an example configuration of a management server.

For example, FIG. 4 is a block diagram schematically illustrating the configuration of the management server.

Referring to FIG. 4, the management server 200 may be implemented as a computing system including hardware and software, and includes a communication unit 210, a database (DB) 220, a display unit 230, and a control unit 240.

The communication unit 210 communicates with a plurality of sealer application devices 100 connected by wired or wireless communications, including an in-house network. In this case, the communication unit 210 may collect the actual sealer usage data from the application controller 130 of the sealer application devices 100, and may transmit control instructions for respective operations.

Further, the management server 200 may communicate with the manager terminal 50, such as a portable notebook computer, a tablet PC, a smartphone, or the like, via wired or wireless communication. Thus, the management server 200 may make an alarm for the occurrence of the sealer failure event to the manager.

The DB 220 stores and manages at least one program and data for automatically managing the actual sealer usage for the plurality of sealer application devices 100 equipped in the vehicle body factory.

For example, the DB 220 stores unique identification information (ID) and locations of the plurality of sealer application devices 100 arranged by line and/or module in the factory, and stores setting information for each application (including painting) operation.

The display unit 230 graphically processes various information generated by the operation of the management server 200 and displays the processed information on the screen. For example, the display unit 230 may display sealer usage state information and sealer usage history management information of the individual sealer application device 100 on the screen.

The control unit 240 controls the overall operation of each of the units for automatically managing the actual sealer usage for painting the vehicle body.

The control unit 240 sets and stores in the DB 220 the facility information (including facility location and unique identification information (ID)) of the sealer application device 100 installed for each process line or process module in the vehicle body factory, and the standard sealer usage considering the individual application works. For example, the standard sealer usage is set through experimentation and learning that takes into account at least one of the target vehicle type, vehicle body part (size, area, etc.), the number of vehicles produced (cumulative application volume), sealer type, sealer drum capacity (gallons/liter), and application unit characteristics (model) applied in an application work (line/process) of the corresponding sealer application device 100. The standard sealer usage may also be set through various experiments, simulations, AI learning, and predetermined algorithms (for example, programs and probability models).

For example, mathematical constant values and variable values for calculating the actual sealer usage and the standard sealer usage may be defined as represented in Table 1 below. Then, the data for each item may be calculated by using a formula.

TABLE 1

Definition of the constants and variables for calculating
the actual sealer usage and the standard sealer usage

| constant | |
| --- | --- |
| Wd (liter) | 1 sealer drum capacity (liters) = 55 gallons, 280.1 liters |
| Wc (liter) | 1 sealer can capacity (liters) = 5 gallons, 18.9 liters |
| 1 gallon 1 liter Converted volume | 1 gallon = 3.785 liters |
| Wdw(kg) | Weight of 1 sealer drum (kg) = 280.1 liters (volume of 1 sealer can) * specific gravity for each sealer type |
| Wcw(kg) | Weight of 1 sealer drum (kg) = 18.9 liters (volume of 1 sealer can) * specific gravity for each sealer type |
| BPR Sealer Specific Gravity | 1.43 |
| Mastic Sealer Specific Gravity | 1.45 |
| Hemming Sealer Ctype Specific Gravity | 1.50 |
| Hemming Sealer Dtype Specific Gravity | 1.20 |
| Structural adhesive Specific Gravity | 1.20 |
| Variable | |
| Cex | Number of times of drum/can replacement by sealer type |

TABLE 1-continued

Definition of the constants and variables for calculating
the actual sealer usage and the standard sealer usage

| | |
| --- | --- |
| Pt | Number of regular production units + number of after-sales production units during the inquiry period |
| Usu | Sealer usage per unit by sealer type |
| Ust | Total standard sealer usage by sealer type = Usu (sealer usage per unit by sealer type) * Pt (number of units produced) |
| Uat | Actual total sealer usage by sealer type = Cex (number of times of sealer drum/can replacement) * Wdw/Wcw (weight per sealer drum/can) |
| Uau | Sealer usage per unit by sealer type = Uat (actual total sealer usage by sealer type) ÷ Pt (number of units produced) |

The control unit 240 shares the information defined in Table 1 with the plurality of sealer application devices 100. Thus, the control unit 240 may collect the actual sealer usage data calculated from each of the plurality of sealer application devices 100. However, the implementation of the present disclosure is not limited thereto, and the actual sealer usage may also be calculated directly by the control unit 240 on the centralized management server 200 (for example, when the application controller 130 fails).

Now, based on the configuration of the smart sealer management system described above, a smart sealer management method will be described.

The smart sealer management method aims to monitor the actual sealer usage of the sealer application device 100 on the management server 200 and respond quickly to the occurrence of a poor sealer usage event to automatically manage the availability of the right amount of sealer for vehicle body painting at the right time, in the right place.

In some implementations, the application controller 130 of the sealer application device 100 and the management server 200 may be implemented as one or more processors operating by interlocking programs, and the set program may be programmed to perform each operation of the smart sealer management method. In some examples, the application controller 130 may include a microprocessor, an electric circuit, etc.

Hereinafter, the smart sealer management method of the present disclosure is described with reference to FIG. 5.

Figure 5:
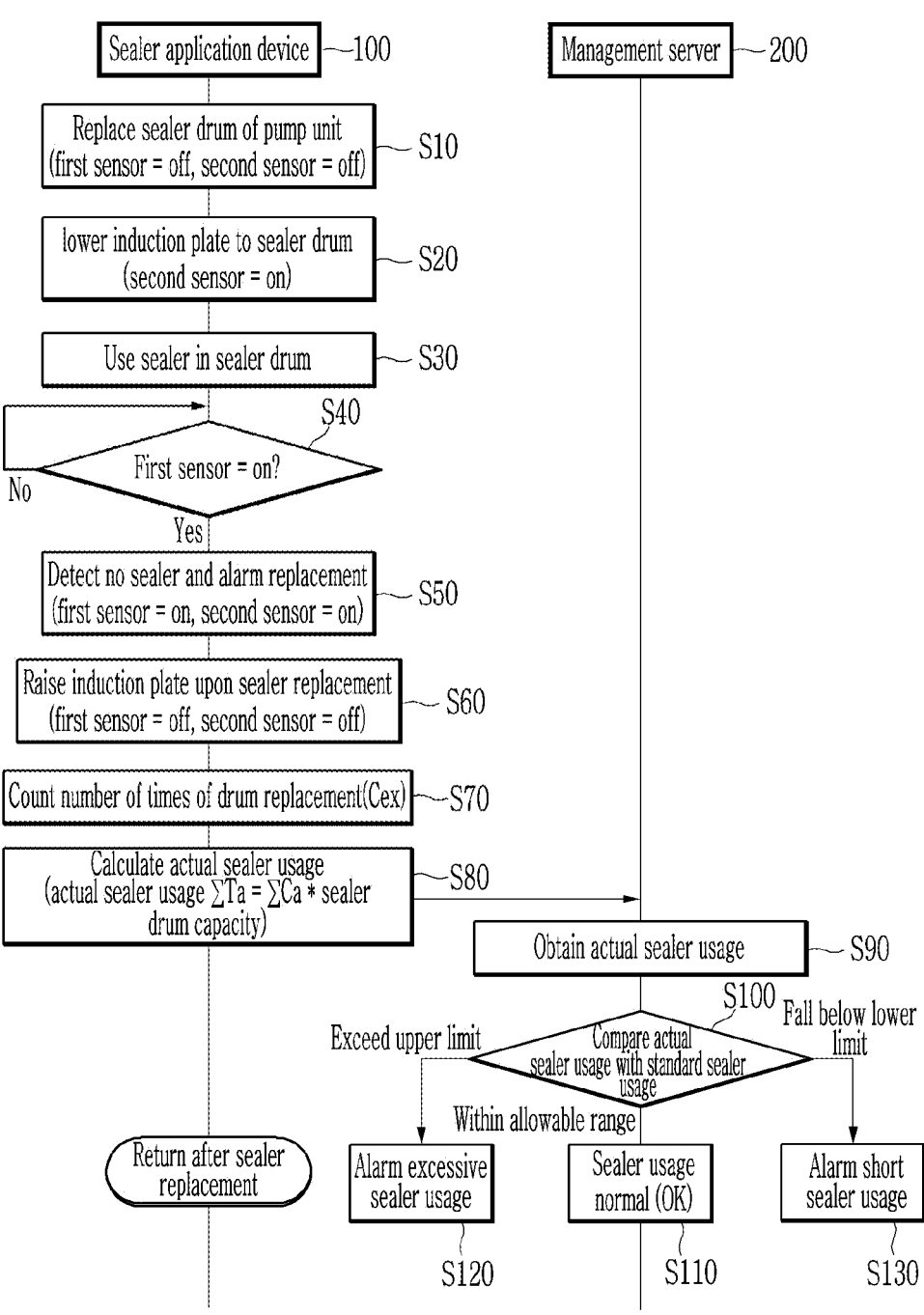
FIG. 5 is a flow diagram schematically illustrating an example of a smart sealer management method.

FIG. 5 is a flow diagram schematically illustrating a smart sealer management method.

Referring to FIG. 5, the smart sealer management method may be described as a control flow in which the application controller 130 of the sealer application device 100 and the management server 200 interlock. Hereinafter, the control flow on the side of the sealer application device 100 will be described with reference to the process of replacing the sealer drum in FIG. 3.

When the sealer drum of the pump 120 is replaced, the application controller 130 of the sealer application device 100 raises the location of the induction plate 19 to a location higher than the upper surface of the sealer drum 1 for smooth replacement (S10). In this case, both the first sensor 111 and the second sensor 112 are in the off state (see (A) of FIG. 3).

The application controller 130 lowers the induction plate 19 to the location of the upper surface of the sealer inside the sealer drum 1 for sealer use immediately after replacing the sealer drum of the pump 120 (S20). In this case, the second sensor 112 for detecting a sealer drum replacement switches to the on state in response to the lowering of the induction plate 19 and remains in the on state until the next sealer replacement (see (B) of FIG. 3).

The application controller 130 continuously lowers the location of the induction plate 19 according to the sealer usage in the sealer drum 1 (S30).

The application controller 130 monitors whether the first sensor 111 for detecting no sealer is switched to on during the sealer use (S40) and, when the first sensor 111 is not switched to on (S40: Yes), the application controller 130 continuously uses the sealer (S30).

When the location of the induction plate 19 reaches the bottom of the sealer drum 1 such that the first sensor 111 is switched to on (S40; Yes), the application controller 130 detects the absence of sealer and generates a sealer drum replacement alarm (S50). In other words, the application controller 130 may detect the absence of sealer in the sealer drum 1 when both the first sensor 111 and the second sensor 112 are switched to on (see (C) of FIG. 3).

The application controller 130 raises the location of the induction plate 19 in order to replace the sealer drum 1 (S60). In this case, the application controller 130 counts the number of times of the sealer drum replacement by one when both the first sensor 111 and the second sensor 112 are switched to the OFF state as the location of the induction plate 19 is raised (S70).

The application controller 130 then calculates the actual sealer usage based on the number of times of the sealer drum replacement counts and transmits the calculated actual sealer usage to the management server 200 (S80). Thereafter, the application controller 130 may return and repeat the process of operations S10 through S70 for each sealer drum replacement cycle.

In some examples, the management server 200 continuously monitors the sealer usage state of the plurality of sealer application devices 100 operating in the factory.

When the management server 200 obtains the actual sealer usage from the application controller 130 of the sealer application device 100 (S90), the management server 200 compares the actual sealer usage with the reference standard sealer usage to determine whether a sealer failure event outside an allowable range occurs (S100).

That is, while monitoring the sealer usage state, the management server 200 compares the actual sealer usage received from a particular sealer application device 100 with the corresponding standard sealer usage and determines that the actual sealer usage is normal (OK) when a result of the comparison is within the allowable range (S110).

In some examples, when the actual sealer usage is outside the allowable range, the management server 200 determines that a sealer usage failure event NG occurs (S120, S130).

In this case, when the actual sealer usage exceeds an upper limit of the allowable range, the management server 200 may determine that a sealer excessive usage event NG #1 occurs (S120), and when the actual sealer usage falls below a lower limit of the allowable range, the management server 200 may determine that a sealer short usage event NG #2 occurs (S130).

Then, the management server 200 recognizes failure cause information including the ID and location of the sealer application device 100 corresponding to the corresponding actual sealer usage when the sealer excessive usage event NG #1 or the sealer short usage event NG #2 occurs. Then, the recognized failure cause information may be displayed on a sealer usage monitoring screen (graphical user interface (GUI)) or an alarm message may be transmitted to the manager terminal 50. The alarm message may be transmitted via text or messenger, such as a numerical alarm and email.

Further, the management server 200 may automatically perform an autonomous application amount management control that reduces or increases the amount of sealer applied in stages for the sealer application device 100 in which the sealer excessive usage event NG #1 or the sealer short usage event NG #2 occurs. The autonomous application amount management control may be implemented according to a program learned based on artificial intelligence (AI), and the data and programs for the autonomous application amount management control are stored in the DB 220 of the management server 200.

Figure 6:
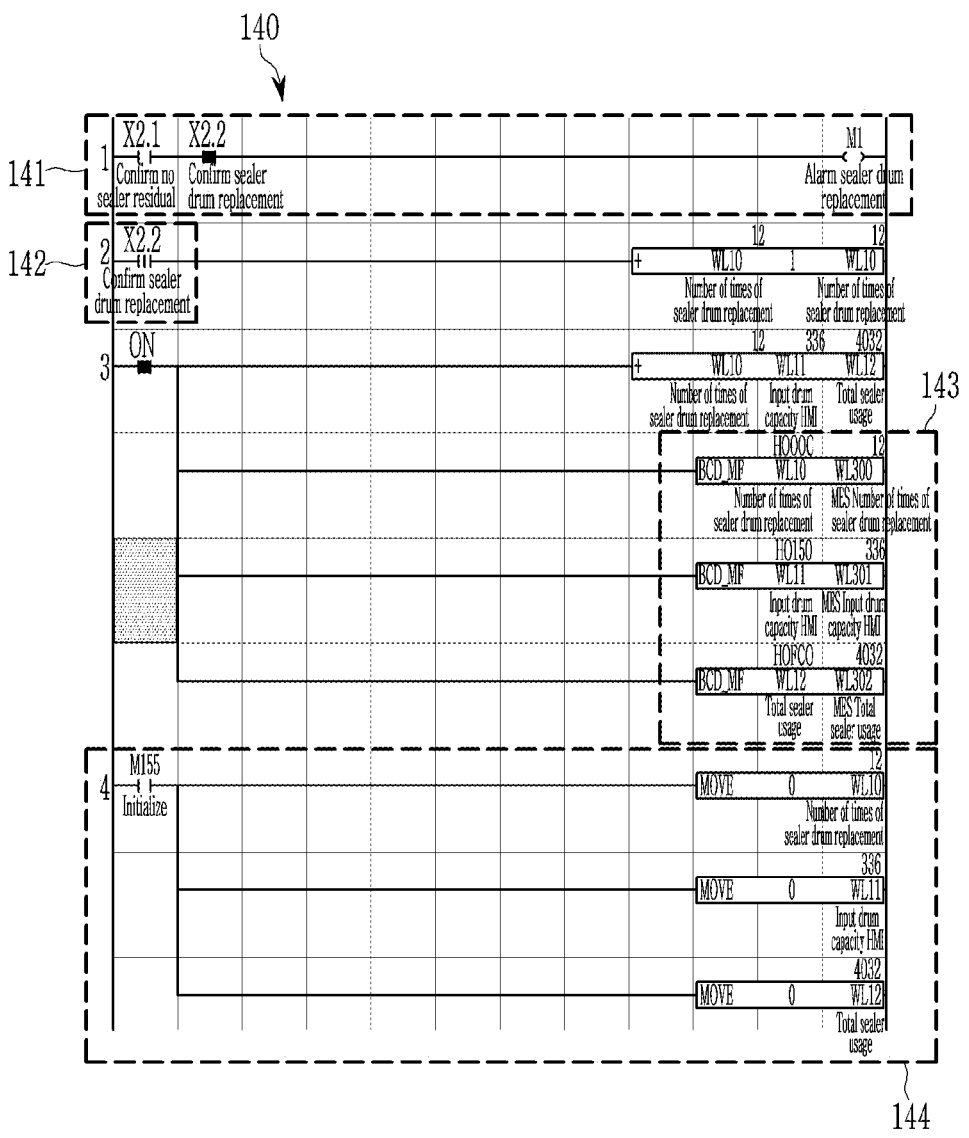
FIG. 6 is a diagram illustrating an example of a program screen that operates under the control of a sealer application device.

FIG. 6 is a diagram illustrating an example of a program screen that operates under the control of the sealer application device.

In some implementations, referring to FIG. 6, the application controller 130 of the sealer application device 100 may display various data generated by the actual operation during execution of the smart sealer management method described above on a computerized screen dashboard 140.

For example, a first display area 141 is a screen that determines that the sealer drum 1 is empty (that is, no sealer) and generates a sealer drum replacement alarm to the manager when the first sensor 111 confirming the absence of sealer in the sealer drum 1 and the second sensor 112 confirming the replacement of the drum are both on.

A second display area 142 is a screen that determines when the first sensor 111 and the second sensor 112 are both switched to on from the OFF state as the time to replace the drum in the empty state by using a program rising pulse. In this case, each time a sealer drum replacement occurs, the number of times of the replacement is counted by 1 and accumulated. Then, the total sealer usage may be calculated by multiplying the accumulated number of times of the sealer drum replacement by the weight of sealer in the drum registered for each sealer type.

A third display area 143 is a screen for calculating and transmitting actual sealer usage data including the number of times of the sealer drum replacement, the type of sealer drum and the capacity per piece, and the total sealer usage including the calculated value of the actual sealer usage to the management server 200.

A fourth display area 144 is a screen for initializing the number of times of the sealer drum replacement, the capacity of the sealer drum, and the actual sealer usage (total sealer usage) according to the operator's setting initialization input.

Figure 7:
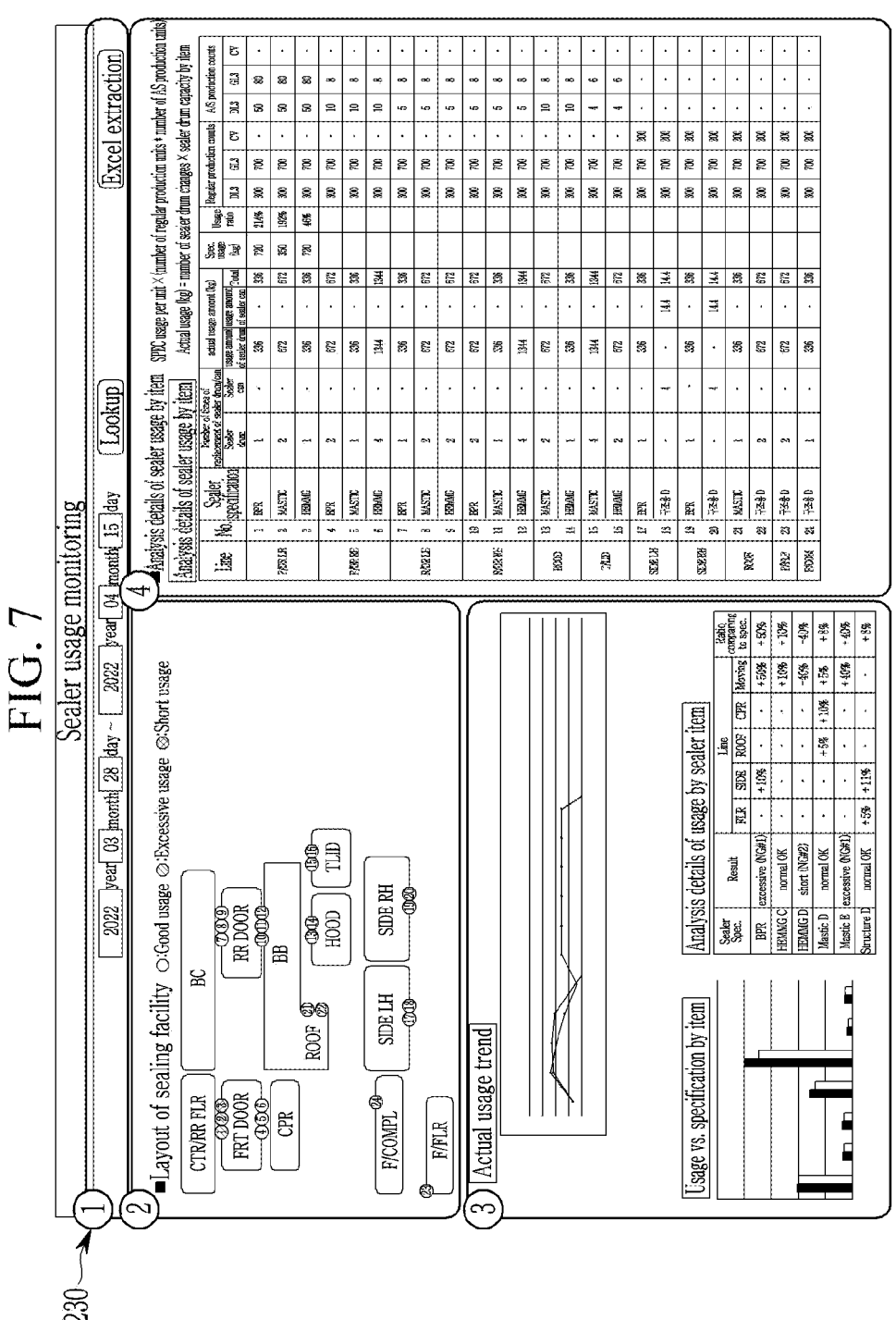
FIG. 7 is a diagram illustrating an example of a sealer usage monitoring screen (graphical user interface (GUI)) of a display unit.

FIG. 7 is a diagram illustrating the sealer usage monitoring screen (GUI) of the display unit.

Referring to FIG. 7, the management server 200 monitors the sealer usage state of the plurality of sealer application devices 100 operating in the factory and displays a result of the monitoring on the sealer usage monitoring screen of the display unit 230.

The sealer usage monitoring screen of the display unit 230 is divided into four main areas.

①represents an analysis filter area. ① The analysis filter area sets an inquiry period (date to date) according to the manager's input. For example, the inquiry period may be set to a unit of at least 2 days to ensure data reliability.

②represents a layout display area by sealer item/line. ② Here, the normal state of the actual sealer usage compared to the standard sealer usage, and the excessive usage and short usage locations are separately displayed by colors. This allows managers to intuitively recognize problem lines, processes, and devices that are excessively and insufficiently using the sealer by sealer type in the factory.

③ represents the usage trend graph area by sealer item. Here, the trend graph comparing the sealer usage against specification during the inquiry period is displayed. In this case, the details of the sealer usage for each sealer item during the inquiry period may be displayed as a bar graph and table. Therefore, the manager may easily recognize the normal OK, excessive (NG #1), and short (NG #2) items by sealer type.

④ represents the detail display area of the sealer usage by item during the inquiry period. Here, the Excel extraction function to get the detailed table of the sealer usage is applied. The extracted information may be used as data for AI-based monthly and seasonal statistical analysis of the sealer usage through the program. The extracted information may also be used as data for setting conditions for optimizing AI-based sealer application facility conditions.

In some examples, it is possible to monitor the actual sealer usage of individual sealer application devices to prevent poor quality due to short usage of the sealer compared to the standard sealer usage, and to prevent waste of subsidiary materials and decreased profitability due to excessive use of sealer.

In addition, by learning the numerical data history considering at least one of the target vehicle type, vehicle part, the number of vehicle produced, sealer type, sealer drum capacity, and application unit characteristics applied to the sealer application work (line/process), the optimal standard sealer usage reference may be established, thereby improving the accuracy of the sealer usage by sealer type, line, and process and reducing the cost of sealer application modification/management.

In addition, by centrally managing the real-time actual sealer usage and real-time fluctuations, and enabling managers to immediately respond to sealer failure events and causes of failure, it is expected to improve the reliability of sealer application quality and prevent waste of subsidiary material costs due to excessive application.

The implementation of the present disclosure is not implement only through the device and/or method described above, and may be implemented through a program for implementing a function corresponding to the configuration of the implementation of the present disclosure, a recording medium in which the program is recorded, and the like, and the implementation may be easily realized by those skilled in the art based on the description of the implementation.

Although an implementation of the present disclosure has been described in detail, the scope of the present disclosure is not limited by the implementation. Various changes and modifications using the basic concept of the present disclosure defined in the accompanying claims by those skilled in the art shall be construed to belong to the scope of the present disclosure.

What is claimed is:

1. A sealer management system comprising:
a sealer drum configured to store a sealer;
a sealer application device comprising an application unit configured to apply the sealer to a vehicle body;
a pump configured to supply the sealer in the sealer drum to the application unit;
a first sensor configured to detect absence of the sealer inside the sealer drum;
a second sensor configured to detect whether the sealer drum has been replaced; and a management server configured to communicate with the sealer application device,
wherein the sealer application device further comprises an application controller that is configured to:
determine a replacement event of the sealer drum based on detection information of the first sensor and the second sensor, and
calculate a sealer usage by counting a number of times of the replacement event of the sealer drum, and
wherein the management server is configured to:
compare the sealer usage obtained from the sealer application device to a set standard sealer usage, and
determine whether a sealer usage failure event occurs.

2. The sealer management system of claim 1, further comprising:
an induction plate disposed in the sealer drum and configured to suction the sealer,
wherein the first sensor comprises:
a first plate that is fixedly mounted to a first side of an upper plate of the pump and extends downward in a longitudinal direction, the first plate being configured to ascend or descend based on an operation of the induction plate; and
a first physical switch configured to, based on the induction plate descending to a bottom of the sealer drum, generate no sealer detection signal in response to the first plate making physical contact with the first physical switch.

3. The sealer management system of claim 2, wherein the second sensor comprises:
a second plate that is fixedly to a second side of the upper plate of the pump and extends downward in the longitudinal direction, the second plate being configured to ascend or descend based on the operation of the induction plate; and
a second physical switch that is configured to:
based on the induction plate descending to detect the sealer in the sealer drum, be turned on in response to the second plate making physical contact with the second physical switch, and
based on the induction plate ascending above the bottom of the sealer drum, be turned off and generate a sealer drum replacement signal in response to a release of the physical contact between the second plate and the second physical switch.

4. The sealer management system of claim 1, wherein the first sensor comprises a first rotary limit switch disposed at a first height with respect to a bottom of the sealer drum, and
wherein the second sensor comprises a second rotary limit switch disposed at a second height different from the first height.

5. The sealer management system of claim 3, wherein the application controller is configured to:
raise the induction plate to a first position higher than an upper surface of the sealer drum based on the sealer drum being replaced, and
after the sealer drum is replaced, lower the induction plate to a second position corresponding to an upper surface of the sealer in the sealer drum.

6. The sealer management system of claim 5, wherein the application controller is configured to:
detect the absence of the sealer in the sealer drum based on (i) the second sensor being turned on based on the induction plate descending toward the bottom of the sealer drum and then (ii) the first sensor being turned on based on the induction plate reaching the bottom of the sealer drum; and generate an alarm to notify the absence of the sealer.

7. The sealer management system of claim 3, wherein the application controller is configured to:

count and accumulate the number of times of the replacement event of the sealer drum based on both of the first and second sensors being turned off while the induction plate is raised for replacing the sealer drum.

8. The sealer management system of claim 7, wherein the application controller is configured to calculate the sealer usage by multiplying the accumulated number of times of the replacement event of the sealer drum by a weight of the sealer that is predetermined based on a sealer type of the sealer.

9. The sealer management system of claim 1, wherein the management server is configured to:

based on the sealer usage exceeding an upper limit of an allowable range, determine that a sealer excessive usage event occurs; and based on the sealer usage falling below a lower limit of the allowable range, determine that a sealer short usage event occurs.

10. The sealer management system of claim 9, wherein the management server is configured to:

based on determining that the sealer excessive usage event or the sealer short usage event occurs, recognize failure cause information that includes an identification (ID) and a location of the sealer application device having the sealer excessive usage event or the sealer short usage event; and transmit an alarm message to a terminal.

11. The sealer management system of claim 9, wherein the management server is configured to perform autonomous application amount management control to reduce or increase an amount of the sealer used in one or more stages of the sealer application device that have experienced the sealer excessive usage event or the sealer short usage event.

12. The sealer management system of claim 1, wherein the set standard sealer usage is set through experiments and learning based on at least one of (i) a target vehicle type, (ii) a vehicle body part, (iii) a number of vehicles produced, (iv) a type of the sealer, (v) a capacity of the sealer drum, or (vi) operation characteristics of the application unit of the sealer application device.

13. A sealer management method of managing a sealer usage of one or more sealer application devices based on detection information of a first sensor and a second sensor, the sealer management method comprising:

lowering, by an application controller, an induction plate to an upper surface of a sealer disposed inside a sealer drum;

based on lowering the induction plate, switching the second sensor to an on-state for detecting a replacement event of the sealer drum;

further lowering, by the application controller, the induction plate based on the sealer usage of the sealer in the sealer drum;

based on the induction plate reaching a bottom of the sealer drum, detecting, by the application controller, absence of the sealer in response to the first sensor being switched on;

generating an alarm to notify the absence of the sealer in the sealer drum; and calculating, by the application controller, the sealer usage by counting a number of times of a replacement even of the sealer drum based on both of the first and second sensors being switched to an off-state while the induction plate being raised for replacing the sealer drum.

14. The sealer management method of claim 13, further comprising:

after calculating the sealer usage, obtaining, by a management server, the sealer usage from the application controller; and comparing, by the management server, the sealer usage to a reference standard sealer usage and determining whether a sealer usage failure event occurs.

15. The sealer management method of claim 14, wherein determining whether the sealer usage failure event occurs comprises:

based on the sealer usage exceeding an upper limit of an allowable range, determining that a sealer excessive usage event occurs; and based on the sealer usage falling below a lower limit of the allowable range, determining that a sealer short usage event occurs.

16. The sealer management method of claim 15, further comprising:

based on determining that the sealer excessive usage event or the sealer short usage event occurs, recognizing failure cause information that includes an identification (ID) and a location of a sealer application device among the one or more sealer application devices corresponding to the sealer excessive usage event or the sealer short usage event; and displaying the failure cause information on a sealer usage monitoring screen, or transmitting an alarm message to a terminal.

17. The sealer management method of claim 15, further comprising:

after determining whether the sealer usage failure event occurs, performing, by the management server, autonomous application amount management control to reduce or increase an amount of the sealer used in one or more stages of a sealer application device among the one or more sealer application devices that have experienced the sealer excessive usage event or the sealer short usage event.

18. The sealer management method of claim 17, further comprising:

after performing the autonomous application amount management control, adjusting, by the application controller, the amount of the sealer by adjusting at least one of (i) a sealer pressure supplied from a pump or (ii) an opening rate of an application unit of the sealer application device in accordance with the autonomous application amount management control of the management server.

\* \* \* \* \*